(12) United States Patent
Jasra et al.

(10) Patent No.: US 7,473,406 B2
(45) Date of Patent: Jan. 6, 2009

(54) PROCESS FOR RECOVERY OF PALLADIUM FROM SPENT CATALYST

(75) Inventors: Raksh Vir Jasra, Gujarat (IN); Pushpito Kumar Ghosh, Gujarat (IN); Hari Chand Bajaj, Gujarat (IN); Arvindkumar Balvantrai Boricha, Gujarat (IN)

(73) Assignee: Council of Scientific and Industrial Research, New Delhi (IN)

(*) Notice: Subject to any disclaimer, the term of this patent is extended or adjusted under 35 U.S.C. 154(b) by 1231 days.

(21) Appl. No.: 10/448,459

(22) Filed: May 30, 2003

(65) Prior Publication Data
US 2004/0241066 A1 Dec. 2, 2004

(51) Int. Cl.
*C01G 55/00* (2006.01)
(52) U.S. Cl. ........................................ 423/22
(58) Field of Classification Search ............ 423/22
See application file for complete search history.

(56) References Cited

U.S. PATENT DOCUMENTS

| 4,072,508 A | | 2/1978 | Vodicka et al. | |
|---|---|---|---|---|
| 4,105,742 A | * | 8/1978 | Edwards et al. | 423/22 |
| 4,331,634 A | * | 5/1982 | Shanton et al. | 423/22 |
| 4,435,258 A | * | 3/1984 | Melka et al. | 205/566 |
| 4,578,250 A | * | 3/1986 | Dimmit et al. | 423/22 |
| 4,654,145 A | * | 3/1987 | Demopoulos et al. | 210/638 |
| 4,705,896 A | * | 11/1987 | Van Der Puy et al. | 564/265 |
| 5,783,062 A | | 7/1998 | Fogel et al. | |
| 6,455,018 B1 | | 9/2002 | Cuif | |
| 7,108,839 B2 | * | 9/2006 | Boricha et al. | 423/22 |

FOREIGN PATENT DOCUMENTS

GB 798712 7/1958

* cited by examiner

*Primary Examiner*—Steven Bos
(74) *Attorney, Agent, or Firm*—Nixon & Vanderhye P.C.

(57) ABSTRACT

The present invention relates to an improved process for the recovery of palladium from spent catalyst. The present invention particularly relates to a suitable method of catalyst recovery of precious metals from spent catalysts or inorganic waste and more specifically the process concerns with the recovery of palladium that is anchored on carbon and is used as catalyst for the hydrogenation of nitro aromatics or as a catalyst for many other organic transformations.

8 Claims, No Drawings

PROCESS FOR RECOVERY OF PALLADIUM FROM SPENT CATALYST

FIELD OF THE INVENTION

The present invention relates to an improved process for the recovery of palladium from spent catalyst. The present invention particularly relates to a suitable method of catalyst recovery of precious metals from spent catalysts or inorganic waste and more specifically the process concerns with the recovery of palladium that is anchored on carbon and is used as catalyst for the hydrogenation of nitro aromatics or as a catalyst for many other organic transformations.

BACKGROUND OF THE INVENTION

Precious transition metal ions and their coordination complexes find industrial applications as supported catalysts and performance chemicals in fine chemicals industries. For example metals like Ag, Au, Pd, Pt and Rh are used in a variety of industrial applications as catalysts for oxidation, hydrogenation and dehydrogenation reactions. Palladium salt catalysts are also widely used in catalyzing such reactions as oxidation, dehydrogenation, hydrogenation, isomerization and dimerization. The efficient recovery and purification of platinum group metals, such as palladium and platinum, from spent catalyst is economically desired. Consequently, lots of research efforts are directed to develop processes for complete recovery of such metals from spent catalysts worldwide. Various polymeric materials, modified silica, zeolite and/or clay materials are used as support for these metals. Similarly, coordination metal complexes of Pd, Pt, Ru and Rh are used as commercial catalysts in homogeneous conditions for hydroformylation and hydrogenation reactions. However, owing to difficulties in separation of metal complexes from product mixtures, there is growing need to developed heterogenized catalysts where coordination metal complexes are supported on polymeric or inorganic solid support like silica, carbon, zeolite, and alumina. Commercially, it is important to recover the precious metals from the support to the maximum extent possible once the catalyst is deactivated.

In certain situations, the catalysts are deactivated during the reaction cycle or subsequent work-up and the reaction effluent may comprise of various remnants, e.g., complexes of various valence states for the metal ions. In many cases, the presence of excessive contaminants reduces the efficacy of recycling of the catalyst. However, the problem related to degradation of catalysts over the repeated cycles, contaminants arise from side reaction and leaching of the effective catalyst for the solid support are common in some cases of heterogeneous catalysts. In view of the environmentally stipulated restrictions on disposal of metal containing waste, effective recovery of the residual precious metals from the reaction effluent is of paramount importance for a process to be environmentally acceptable and economically viable.

Furthermore, during the recovery of precious metals from ore or scrap including spent catalysts, the use of solvent extraction to separate the precious metals from one another and from base metals that may also be present is becoming more widespread. The hydrometallurgical processes employed for the separation and recovery of the platinum group metals, (e.g., platinum, palladium and rhodium), typically involve dissolving the metal ions by some type of oxidative acidic chloride leach, typically with aqua regia or hydrochloric acid/chlorine gas followed by solvent extraction.

Reference is made to the U.S. Pat. No. 4,705,896 (1987) to Van Der Puy et al., who have disclosed the extractants for the recovery of palladium using ortho alkoxy substituted phenyl oxime compounds which are useful for selectively separating and recovering palladium from aqueous compositions and mixtures containing palladium and other metals. In this patent, the oximes employed for the extraction of palladium are hydroxyoxime and derivatives, which are expensive considering the industrial application.

U.S. Pat. No. 4,654,145 (1987) to Demopoulos, et al., discloses the recovery of precious metals, particularly gold and the platinum group metals, from metal chloride solutions, by solvent extraction and selective stripping/precipitation. The active extractant used was, in particular alkyl substituted 8-hydroxyquinoline. Gold is precipitated either by hot water, or by hydrogen after a cold water wash. Palladium in the organic phase is precipitated either by hydrogen reduction or is stripped with mineral acid. Platinum stripped into aqueous solution can be recovered by hydrogen reduction in stages. The organic phase is not degraded providing acid is washed out before any hydrogen reduction, and can be recycled. The process required washing out of acid from the organic phase before solvent can be recover and reuse which is a multi step process.

G.B. Patents No. A-2127001, 1984 to Hunter William, discloses a process for recovering, precious metals viz. gold, palladium and platinum from a solution of at least one dissolved compound of that precious metal. The process comprises the adsorption of one precious metal on the activated carbon, wherein said activated carbon is in the form fibers. The loaded fibrous body is treated with aqueous cyanide solution to recover the metal ion. The main limitation of the process is that cyanide ligand must have high affinity for precious metals to be recover.

U.S. Pat. No. 4,578,250 (1986) to Dimmit, et al., discloses the separation and purification of palladium present in a aqueous solution with at least one other platinum group metal by adjusting the pH of the solution from 0 to 5, followed by treating the acidified solution with an ortho alkoxy substituted phenyl oxime by using solvent extractions techniques. Illustrative of useful solvents are aromatic, aliphatic and cyclo-aliphatic hydrocarbons such as toluene, cyclohexane, xylenes, chlorinated hydrocarbons and kerosene. The preferred solvent is kerosene. The aqueous phase was separated from the organic phase, followed by stripping of palladium from the association with the oxime compounds in the organic phase by extraction with an aqueous ammonia solution. The drawback of the process is that it involves multistage processes. Moreover recovery of solvent for further reuses makes the process complicated.

U.S. Pat. No. 4,435,258 (1984) to Melka, Jr., et al., discloses the recovery of palladium from spent electroless catalytic baths by dissolving the palladium to form a true solution followed by electro-deposition employing a nickel anode and a nickel or copper cathode. The recovery includes the steps of (a) dissolving the colloidal palladium in the bath so as to form a true solution by the addition of an oxidizing agent, e.g., hydrogen peroxide, (b) heating the bath to a temperature and for a time sufficient to essentially remove excess hydrogen peroxide, (c) placing the solution in an electrolytic cell having (i) a nickel anode, and (ii) a cathode comprised of a metal or metallic surface which is non-contaminating or easily separable from the palladium to be deposited; and (d) electrowinning palladium from the solution onto the cathode at a voltage which tends to minimize and substantially reduce tin deposits.

It has been found that with continued use, the catalytic bath becomes contaminated with copper from the copper cladding. When contamination reaches an extent such that the bath becomes ineffective or the electroless plating becomes less adherent than desirable, and must then be discarded, as waste hence may not be suitable for commercial application.

U.S. Pat. No. 4,105,742 (1978) to Edwards, et al., for the process for the separation of platinum and/or palladium from acid starting solutions containing the chlorocomplexes thereof together with other platinum group metals and/or base metals in 0.01 to 2M acid solutions comprises contacting the starting solution with a suitable extractant; the extractant soluble in water-immiscible solvent, carried in an organic phase and comprising functional groups of the formula $R_2N$—$CH_2$—COOH wherein R is a long-chain alkyl group and thereafter separating the two phases and recovering the extracted platinum or palladium or both from the loaded solvent extractant. These extractant are generally very expensive and use organic solvents that are not environment friendly, are not suitable for industrial application.

C. S. Patent No. 251467 (1988); to Pauko Jan, (Chemical Abstract 109 (24): 213964) disclose the recovery of palladium from wastewater by sorption on activated carbon, pretreated with an alkali metal salt of Ethylenediaminetetraacetic acid (EDTA). The wastewater is required to be acidified to pH 3-7.5 before treating with activated carbon with EDTA solution to recover precious metals. However, this is useful for homogenous aqueous catalyst waste and is not directly applicable to non-aqueous systems.

JP Patent No. 54 9597 (1978) discloses the regeneration and recovery of palladium from spent residue, obtained from a catalytic process performed in homogeneous conditions, which is subjected to heating ca. 550 to 600° C. to decompose the organic fragment. The residue is then acid treated to obtain corresponding palladium salt. However, this invention has a limited scope in the sense that it is only concerned with degradation of metal complex having lower aliphatic monocarboxylic acids as the organic moiety.

U.S. Pat. No. 4,331,634 (1982) to Sbanton; Kenneth J. and Grant; Richard A., wherein strongly acidic solution of sulphuric, hydrochloric, perchloric or nitric acid is used as stripping solvent for the extraction of the palladium from the organic acidic solution containing oxime as extracting reagent. The organic phase may also contain an anionic phase transfer material or catalyst to aid the extraction process. In this patent, the oximes employed for the extraction of palladium are hydroxyoxime and derivatives, which are expensive considering the industrial application.

Y. Baba, K. Inoue, K. Yoshizuka and T Furusawa, (Industrial Engineering Chemistry-Research, Volume 29, (1990), page 2111) have described the use of non-cheating oximes such as dodecanal oxime, decanal oxime, octanal oxime and hexanol oxime for the extraction of palladium metal. This report also has drawback in the sense that the oximes employed for the extraction are expensive considering the industrial application According to above prior art, most of the metal recovery methods are applicable to the homogeneous reaction mixtures and employ chelating agents for extracting metal ions. Process known in the prior art for recovery of metals from supported catalysts also makes use of mineral acids and invariably destroyed the support structure.

OBJECTS OF THE INVENTION

The main object of the present invention is to provide an improved process for the recovery of palladium from spent catalyst that obviates the drawbacks as detailed above.

Another object of the present invention is to recover palladium from the spent catalyst generated from the hydrogenation plant used for the hydrogenation of nitro aromatic compounds.

Still another object of the present invention is to recover 100% palladium with more then 99% purity.

Yet another object of the present invention is to recover carbon black as a value added product that can be reused.

SUMMARY OF THE INVENTION

The aim of the present invention is directed to provide an improved process for the recovery 100% palladium from spent catalyst with more than 99% purity. The spent catalyst obtained from hydrogenation plant contains i) Pd in the range 0.1 to 0.2%, ii) Fe in the range 0.1 to 0.2%; iii) Carbon in the range 15 to 25%; iv) Moisture in the range 60 to 80% and v) 3 to 6% tar of dinitrotoluene was used to recover precious palladium as palladium salt. The spent catalyst was subjected to heat treatment at ca. 500° C. to decompose organic moiety and then digested in mineral acid for a stipulated period to dissolve the palladium metal as corresponding salt and separate the carbon particles by filtration. Solid palladium chloride with high purity was obtained by adjusting the pH of filtrate. This product does not require any further purification steps. Palladium recovered as palladium salt can be used for loading/anchoring on support materials which finds application as catalyst or catalyst support.

Accordingly the present invention provides a process for the recovery of palladium from spent catalyst generated from hydrogenation plant, the process comprising
 (i) thermally treating finely divided spent catalyst generated from a hydrogenation plant,
 (ii) cooling the spent catalyst obtained from step (i) above to room temperature ranging between 20 to 40° C. in air;
 (iii) digesting the thermally treated and cooled spent catalyst in a mineral acid selected from the group consisting of nitric acid, hydrochloric acid and sulfuric acid;
 (iv) reacting the acid with the spent catalyst under continuous stirring;
 (v) filtering the reaction mixture to separate carbon particles from the liquid;
 (vi) precipitating palladium as metal salt;
 (vii) drying the metal salt.

In one embodiment of the invention, the thermal treatment of the spent catalyst in step (i) is carried out at a temperature in the range of 350 to 450° C. and for a period selected from 4 to 6 hours.

In another embodiment of the invention, the Palladium, Iron, Carbon and moisture content in the spent catalyst is maintained between 0.1 to 0.2, 0.1 to 0.2, 15 to 25% and 60 to 80% respectively.

In yet another embodiment of the invention, the heat treatment is carried out in inert atmosphere or in air.

In yet another embodiment of the invention, the inert atmosphere is obtained using a gas selected from the group consisting of nitrogen, argon and helium.

In another embodiment of the invention, the concentration of mineral acid for digestion is maintained between to 2 to 6 molar.

In a further embodiment of the invention, the temperature and time needed for acid digestion is maintained between 50 to 90° C. and 4 to 6 hours respectively.

In yet another embodiment of the invention, the palladium is precipitated as a metal salt at a pH in the range of 6 to 11.

In yet another embodiment of the invention, the metal salt is dried in an air dried oven at a temperature in the range of 90-110° C.

In yet another embodiment of the invention, the recovery of palladium as metal salt is 100%.

In a further embodiment of the invention, carbon particles are recovered as by product in the form of carbon black.

In yet another embodiment of the invention, the metal salt is palladium chloride.

DETAILED DESCRIPTION OF THE INVENTION

The present invention provide an improve process for the recovery of palladium from spent catalyst generated from hydrogenation plant by the steps of
(i) thermal treatment of finely divided spent catalyst in the temperature range of 350 to 450° C. for a period selected from 4 to 6 hours.
(ii) maintaining an inert atmosphere during heat treatment using gases like nitrogen, argon, helium and the like gases.
(iii) cooling the spent catalyst to room temperature (i.e. 20 to 40° C.) in air.
(iv) digesting the calcined spent catalyst in the mineral acids selected from nitric acid, hydrochloric acid or sulfuric acid at a concentration in the range 2 to 6 molar.
(v) allowing the acid to react with the spent catalyst under continuous stirring at a temperature in the range of 50 to 90° C. and for a period of 4 to 6 hours.
(vi) filtering the reaction mixture to separate carbon particles from the liquid by known techniques.
(vii) precipitating the palladium as metal salt in the pH range 6 to 11.
(viii) drying the metal salt in air dried oven in the temperature range 90 to 110° C.

The catalyst generated from the hydrogenation plant contains i) Pd in the range 0.1 to 0.2%; ii) Fe in the range 0.1 to 0.2%; iii) Carbon in the range 15 to 25%, iv) Moisture in the range 60 to 80% and v) 3 to 6% tar of dinitrotoluene may be used to recover palladium metal.

The finely divided spent catalyst may be subjected to heat treatment in the temperature range 350-450° C. for a period of 4 to 6 hours. The heat treatment is preferably carried out in inert atmosphere using gases like nitrogen, argon or helium and like gases. The calcined catalyst is preferably digested in mineral acids like nitric acid, hydrochloric acid or sulfuric acid and like acids. The digestion of the spent catalyst in acid is preferably carried out at temperature in the range of 50 to 90° C. for a period selected from 4 to 6 hours. The acid concentration used for the digestion can vary in the range of 2 to 6 molar.

The pH of the filtrate can be varied in the range 6 to 11 to precipitate palladium as a metal salt such as palladium chloride.

Palladium is estimated, in acidic aqueous solution as brown-red complex, $[PdI_4]^{2-}$. In an acid medium (hydrochloric acid, $H_2SO_4$) containing excess of iodide, palladium forms a brown-red complex, $[PdI_4]^{2-}$. The molar absorptivity of the complex is $1.02 \times 10^{-4}$ at $\lambda_{max}$=410 nm (a=0.096). A calibration curve is obtained by preparing a palladium iodide complex solution by dissolving the known amounts of palladium chloride and other reagent, like concentrated hydrochloric acid, ascorbic acid and potassium iodide. The detailed procedure is as follows.

Accurately measured volume/weight of the sample solution/solid containing (w/v) not more than 1 mg of Pd was taken in a 100 ml volumetric flask. To this was added 10 ml of 6N hydrochloric acid, 20 ml of 20% (w/v) potassium iodide solution, and 4 ml of 1% (w/v) ascorbic acid solution. The volume was made up to 100 ml with water in a 100 ml volumetric flask, and absorbance at 410 nm against water was measured Wt of Palladium in the diluted solution can be obtained as:

Wt of Pd per 100 ml=$(A/\epsilon)$ (Mol Wt of Palladium)

A=Absorbance of the 100 ml solution at 410 nm $\epsilon$=Extinction coefficient, $1.02\epsilon^4$ $mol^{-1}cm^{-1}$ for $[PdI^4]^{2}$ species at 410 nm Palladium has also be estimated spectrophotomertically using ICP spectrometer. This is most accurate method of estimation or metals ions at ppm/ppb levels. A calibration curve was obtained by dissolving a known amount of palladium chloride in hydrochloric acid and recoding its intensity on ICP spectrometer for palladium at 340.458 nm using Perkin Elmer's Inductively Coupled Plasma Emission Spectrometer.

The present process involves thermal desorption of oligomerized nitro or amino organic compounds generated during hydrogenation of nitroaromatics and get adsorbed on the active sites present on the surface of the catalyst followed by oxidation of the carbonaceous compound which are relatively of lower carbon number in air at lower temperature. This oxidation step being exothermic in nature initiates the oxidation of carbon support which result into thermal cascading effect and oxidizes the entire carbonaceous matter present in the catalyst contains without supplying of additional heat. The ashed catalyst contains the insoluble oxides of the palladium or other metals are brought into solution by oxidization with aqueous solution as salt of mineral acid. Metals that are present in the aqueous solution as salt of mineral acid are selectively precipitated out by adjusting the pH of the solution.

The inventive steps in the process are (i) the removal of oligomerized organic compounds in inert atmosphere prior to oxidation of carbonaceous compounds (ii) oxidation of carbonaceous compounds having low carbon number compounds at around 500° C. and use of thermal energy generated for initiating oxidation of carbon support, (iii) dissolution of metals present in the ashed content by digestion with mineral acid and selective precipitation of the metal salt by control of solution pH.

The process has advantage of obviating very high temperature incineration to recover precious metals. Selective precipitation of the metal salts results into recovery of the metals salts with very high purity. This product does not require any further purification steps, solvent extraction technique and use of costly organic complexing ligands like oxime, hydroxyoxime and derivatives etc., for metal recovery.

The following examples are given by way of illustration and therefore should not be constructed to limit the scope of the present invention.

EXAMPLE I 715 g of spent catalyst, containing 0.15% palladium, 0.15% Iron, 5% m-dinitrotoluene, 20% carbon and rest water placed in an electric muffle furnace, was dried for 3 hour at 150° C. The dried spent catalyst containing Pd, Fe and organic compounds was fired at an elevated temperature up to 400° C. for a period of 5 hrs. The powdery-fired product was obtained. All the carbon burnt and weight of the ash containing precious metal was found to be 4.3 g, and the brown-fired mixture so obtained was digested in 2M hydrochloric acid for 5 hours at 90° C. It was filtered with Buckner funnel after cooling to ambient temperature. The pH of the filtrate, which contained palladium, was raised to 6 and precipitate formed were filtered to remove impurity especially of iron and other metals. The precipitates were collected and dried. The pH of the filtrate obtained at pH 6 was raised to 9.5 and precipitate collected and dried.

The precipitates obtained at pH 6 and pH 9.5 was analyzed for palladium content. 0.745 g of the precipitate was obtained at pH 6, which contains no palladium. 1.026 g of precipitate collected at pH 9.5 contains 0.59 g palladium determine spectrophotometrically. The total palladium content adsorbed on the carbon, based on initial palladium impregnated on the carbon was 0.605 g showing 98% recovery by above process.

EXAMPLE II 566 g of spent catalyst was dried in an electric furnace for 3 hours at 150° C. and subsequently calcined at 400° C. for a period of 5 hours. The brown-colored mixture so obtained was digested in 2M-hydrochloride acid for 3 hours while maintaining the temperature at 80° C. and under continuous stirring. The reaction mixture was filtered to separate ash and dissolved matter. The pH of the filtrate so obtained was raised initially to 6, whereby the precipitates of iron chloride were removed by filtration. The pH of the second filtrate was again raised to 9.5 and the precipitates were collected and dried. 0.882 g of precipitates contain 0.65 g palladium evidencing 100% recovery of palladium as palladium chloride determined spectrophotometrically.

EXAMPLE III 566 g of spent catalyst was dried in an electric furnace for 3 hours at 150° C. and subsequently calcined at 400° C. for a period of 3 hours. The brown-colored mixture so obtained was digested in 2M-hydrochloride acid for 3 hours while maintaining the temperature at 80° C. and under continuous stirring. The reaction mixture was filtered to separate ash and dissolved matter. The pH of the filtrate so obtained was raised initially to 6, whereby the precipitates of iron chloride were removed by filtration. The pH of the second filtrate was again raised to 9.5 and the precipitates were collected and dried and recovered $PdCl_2$ was also estimated by Gravimetric analysis using Dimethylglyxime as complexing agent. 25 mg isolated solid (at pH=9.5) was dissolved in 25.0 ml (6M HCl) and to this was added 20 ml Dimethylglyoxime solution (prepared in ethanol, 250 mg/25 ml) and the mixture was stirred and kept for 1 hour. After that it was filtered in a pre-weighed G-3 crucible and washed with cold and hot water and the precipitate so obtained was dried at 110° C. Weight of Pd $(dmg)_2$=0.0476 g, which is equivalent to 25 mg of $PdCl_2$. From these results, it is clear that both the methods gave identical results and also show that the recovered $PdCl_2$ is 100% pure.

EXAMPLE IV 250 g of an spent catalyst placed in an electric muffle furnace was first dried for 3 hour at 150° C. After nitrogen gas was introduced into the furnace at the rate of 200 Nl/hour, the residue was heated at a temperature at 400° C. over the period of 2-4 hour to remove organic residue (tar and nitro aromatics and aromatic amine). The spent residue so obtained was digested in 2500 ml 3M hydrochloric acid for 8 hours. It was filtered with Buckner funnel after cooling to ambient temperature followed by washing with dilute hydrochloric acid was dried at 100° C. in an oven. The pH of the filtrate was raised to about 6 and precipitate formed filtered to remove impurity especially of iron and other metals. The precipitates were collected and dried. The pH of the filtrate was then raised to above 9 and precipitates collected and dried.

The precipitates obtained at about pH 6 and at pH 9.5 were analyzed for palladium content 0.2 g, of the precipitate was obtained at pH about 6, which contains no palladium. 1.1 g of precipitate collected above pH 9 contains 0.052 g palladium determine spectrophotometrically giving 8% recovery by above process. The precipitate obtained above was further purified and gave 0.087 g $PdCl_2$ with 100%.

EXAMPLE V 200 of a spent catalyst containing placed in an electric muffle furnace was first dried for 3 hour at 150° C. After nitrogen gas was introduced into the furnace at the rate of 200 Nl/hour, the residue was heated at a temperature at 400° C. for 5 hour to remove organic residue (tar and nitro aromatics and aromatic amine). The spent residue so obtained was digested in 2000 ml, 50% hydrochloric acid for 7 hours. It was filtered with Buckner funnel after cooling to ambient temperature followed by washing with 0.5 M aqueous hydrochloric acid, the carbon so obtained was dried at 100° C. in an oven. The pH of the filtrate, which contained palladium, was raised to about 6 and precipitate formed filtered to remove impurity especially of iron and other metals, if any. The precipitates were collected and dried. The pH of the filtrate obtained at pH 6 was raised to 9.5 and precipitate collected and dried.

1.05 g of precipitate collected at pH 9.5 contains 0.163 g palladium determine spectrophotometrically giving 98% recovery by above process. The precipitate obtained above was further purified and gave 0.16 g $PdCl_2$ with 100%.

We claim:

1. A process for recovering palladium from a finely divided spent catalyst generated from a hydrogenation plant, the process comprising
    (i) thermally treating said spent catalyst, wherein the palladium is anchored on carbon;
    (ii) cooling said thermally treated spent catalyst to a temperature from 20 to 40° C. in air;
    (iii) digesting said cooled spent catalyst in a mineral acid in a reaction mixture under continuous stirring, wherein the mineral acid is selected from the group consisting of nitric acid, hydrochloric acid, and sulfuric acid;

(iv) filtering said reaction mixture to separate carbon particles from filtrate;

(v) precipitating palladium as a metal salt from the filtrate; and (vi) drying said metal salt.

2. A process as claimed in claim 1 wherein thermal treatment of said spent catalyst is carried out at a temperature from 350 to 450° C. and for a time from 4 to 6 hours.

3. A process as claimed in claim 1 wherein Palladium, Iron, Carbon, and moisture content in said spent catalyst are between 0.1-0.2, 0.1-0.2, 15-25%, and 60-80% respectively.

4. A process as claimed in claim 1 wherein thermal treatment is carried out in an inert atmosphere comprising gas selected from the group consisting of nitrogen, argon, and helium.

5. A process as claimed in claim 1 wherein mineral acid for digestion is maintained at a concentration from 2 to 6 molar.

6. A process as claimed in claim 1 wherein acid digestion is carried out at a temperature from 50 to 90° C. and for a time from 4 to 6 hours.

7. A process as claimed in claim 1 wherein the palladium precipitation is carried out at a pH of the filtrate from 6 to 11.

8. A process as claimed in claim 1 wherein the recovery of palladium as metal salt is 100%.

* * * * *